Dec. 3, 1968  N. H. SIEGEL  3,414,219
BRACKET
Filed Jan. 26, 1967
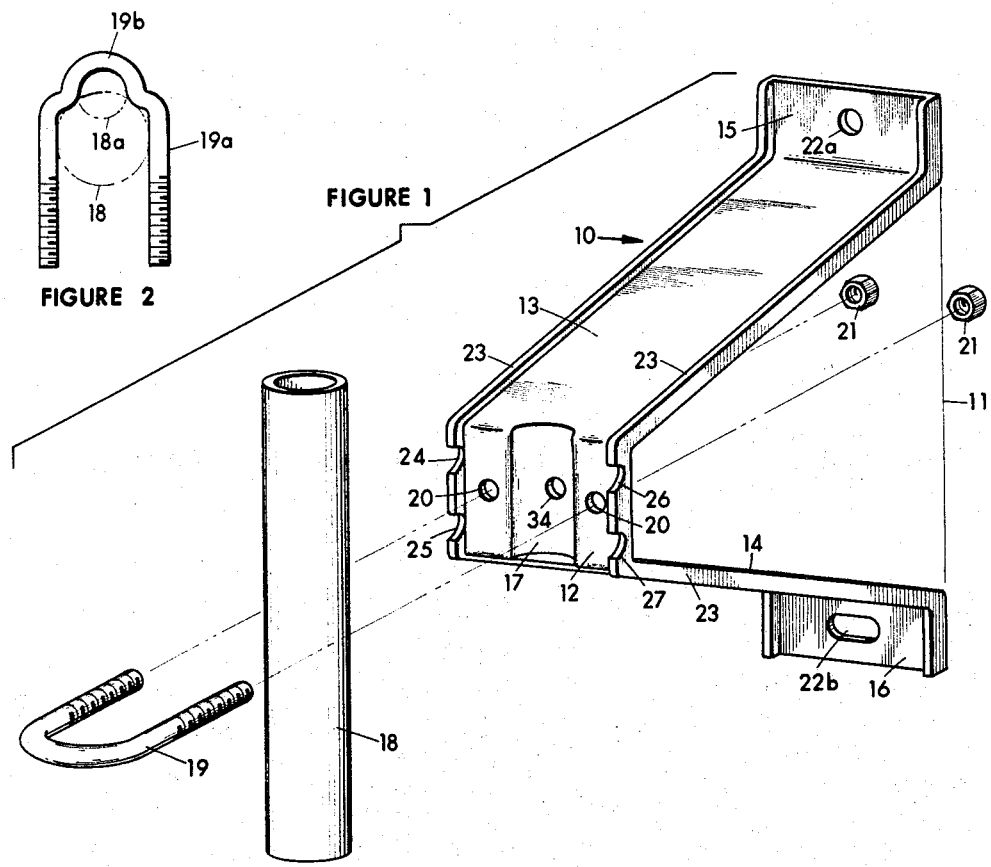
NORMAN H. SIEGEL INVENTOR
BY John J. Schlager
ATTORNEY

United States Patent Office 3,414,219
Patented Dec. 3, 1968

3,414,219
BRACKET
Norman H. Siegel, Syracuse, N.Y., assignor to All-State Stamping Corporation, Syracuse, N.Y., a corporation of New York
Filed Jan. 26, 1967, Ser. No. 611,903
10 Claims. (Cl. 248—65)

ABSTRACT OF THE DISCLOSURE

A wall bracket, particularly adapted for the rigid mounting of either a gas meter pipe or a gas meter channel-type bar has a one-piece frame in the general shape of a truncated triangle. The flat top of the triangle has a recessed groove for receiving the meter pipe longitudinally of the bracket, the pipe being secured to the bracket by U-bolt means. The edges of the frame are turned outwardly and notched at the top of the triangle to receive the arms of a meter bar having a channel-shaped or I-shaped cross-section, the meter bar being secured to the bracket by bolting means through an aperture in the recessed groove.

BACKGROUND OF THE INVENTION

*Field of the invention*

This invention relates to brackets for mounting pipes, tubes, I-bars, channel bars and the like to fixed surfaces. More particularly, it relates to brackets useful in mounting gas meters to building foundations via attachment to the bracket of either the meter bar itself or the meter inlet or outlet pipe.

*Description of the prior art*

It has been known to attach meters and the like to building foundations by various bracket means. Prior devices have generally been subject to such disadvantages as (a) lack of rigidity between the bracket and the meter or its connections, (b) high cost of manufacture to overcome the rigidity problem, (c) lack of versatility in installation.

In the low cost conventional type brackets, the meter inlet or outlet pipe is usually attached simply to a planar surface of a triangular bracket by U-bolt means and the like. Regardless of the degree of tightening of the U-bolt, the pipe has a tendency to slip or swivel on the planar surface due to the weight of the meter. This leads to poor meter connections, non-uniformity in the mounting of several meters together, unsightly appearance, and a generally unsatisfactory situation. Various bracket means have been devised to overcome such problems by ensuring a rigid perpendicular alignment of the meter pipes so as to provide a neat, professional-looking appearance. One such means is shown, for example, in U.S. Patent No. 3,208,704 to William B. McDowell, which consists of the use of a vertical channel upright with lateral and symmetrical channels extending outwardly therefrom to which are attached the inlet and outlet meter pipes. Such relatively complicated devices are costly and not susceptible to widespread use or mass production.

Another factor associated with the acceptance of a meter bracket by the utility companies is the availability of a preassembly option in order to reduce installation cost. Conventional brackets usually require several connections at the site of the meter installation; e.g. to assemble the bracket where it is provided in several pieces, to attach the meter or an extension thereof to the bracket, to attach the meter to the building wall, etc. It is preferred to reduce the number of operations which need be performed in the field. Accordingly, provision of means for the rigid preassembly of a meter-bracket unit which is easily transportable to the site of installation and readily attachable to the building foundation is highly desirable.

A further desirable feature of a gas meter bracket is versatility. The more installation configurations possible, the more desirable and acceptable is the bracket. Because of space limitations and/or obstructions commonly encountered in gas meter installations, which can add greatly to the time and expense of installation, it is desirable to provide a choice of different configurations.

SUMMARY OF THE INVENTION

The present invention is directed to a one-piece bracket for the mounting of a pipe, tube, I-bar, channel bar and the like to a fixed surface. The bracket is particularly adaptable to the installation of gas meters and the like, which can be mounted on a wall or building foundation in one of two alternate configurations, and at one of two different heights, as will hereinafter become apparent. The bracket of the invention is formed from a single piece of sheet metal in a series of steps adapted for rapid punch press and forming operations. The production costs of the bracket of the invention are well below those associated with the conventional brackets in common use due to the mass production techniques made possible by its one-piece nature, simplicity and adaptability. Economy in the use of substantial quantities of such brackets results.

The bracket of the invention generally comprises a one-piece metal frame bent into the shape of a truncated triangle. The flat top of the triangle has a recessed groove adapted to receive a pipe or tube, such as the inlet or outlet pipe of a gas meter. In this alternate position, which is similar but superior to conventional meter attachments, the pipe will be affixed to the bracket by U-bolt means. The provision of the recessed groove to provide a snug-fitting relationship between the pipe and the bracket ensures the desired rigidity and overcomes the above-mentioned swiveling problems now commonly experienced with conventional brackets. For maximum rigidity, it will be preferred to dimension the groove closely to the outside diameter of the pipe.

The edges of the bracket frame are bent outwardly to thereby increase the rigidity of the bracket. The turned edges at the flat top of the triangular bracket are each provided with a pair of notches adapted to receive the arms of a channel bar, I-bar and the like. Means are thus provided for the alternate mounting of gas meters via connection of the bracket to what is commonly known in the art as a "meter bar." Said meter bar conventionally has a channel-shaped or I-shaped cross-section and is provided at each end with a threaded pipe elbow so as to provide inlet and outlet connections for parallel pipes running to the meter. By mounting the arms of the cross-sectional I in the notches provided in the turned top edges of the bracket and bolting the web of the meter bar to the bracket, a rigid, essentially immovable connection is obtained. This alternate connection is particularly adaptable to preassembly. For example, the meter bar-to-bracket connection can readily be made by the meter bar manufacturer or by the utility company and transported to the meter installation site. If desired the meter, meter bar and bracket can be preconnected and simply attached to a building foundation as a unit. The number of time-consuming manual connection steps at the installation site can thus be sharply reduced with consequent cost savings.

The versatile bracket of the invention thus provides the utility company with two options for the mounting of gas meters; i.e. the bracket connection may be made to the meter pipes or to the meter bars. In either case, the utility company is provided with extremely rigid, relatively immovable units, preassembly options, improved appearance and performance, and substantial reduction in materials and installation costs. Swiveling and sidewise displacement of the meter are minimized, if not eliminated, so that the alignment of a row of meters remains parallel and uniform as opposed to haphazard.

A further feature adding to the versatility of the bracket of the invention is that the legs of the triangular frame extend at different obtuse angles from the truncated top. Thus, by simply rotating the bracket 180°, the meter and attachments can be raised or lowered to avoid an obstruction or to gain more space without the necessity for tapping new holes in the building foundation for reattachment purposes.

DESCRIPTION OF DRAWING AND PREFERRED EMBODIMENT

The above and other novel features of the invention appear more fully hereinafter from the following detailed description when taken in conjunction with the accompanying drawing which is employed for illustrative purposes.

In the drawing, wherein like reference characters indicate like parts:

FIGURE 1 is an isometric view showing in exploded form the bracket of the invention and the placement of a pipe and connecting U-bolt;

FIGURE 2 is a front view of an alternate U-bolt for use with the bracket of the invention;

FIGURE 3 is a partial isometric view showing in exploded form the bracket of the invention and the placement of a meter bar having integral pipe elbows and a connecting bolt; and FIGURES 4 and 5 are fragmentary elevational views of the web and arms of the meter bar of FIGURE 3 showing the seating of the meter bar's arms in the notches of the bracket.

Referring to the drawing, there is shown a one-piece, metal bracket frame 10 which is bent into the general shape of a truncated triangle having an imaginary base 11. The frame 10 has a top portion 12 spaced apart from and generally parallel to the imaginary base 11, a pair of legs 13 and 14 extending at obtuse angles from the opposite ends of the top portion 12, and a pair of feet 15 and 16 extending outwardly at obtuse angles from the bottoms of legs 13 and 14, respectively, as extensions of the imaginary base 11.

The top portion 12 has a relatively planar surface provided with a longitudinal recessed groove 17 running in a direction generally parallel to the imaginary base 11 and generally centered in top portion 12. Groove 17 thus defines an elongated cylindrical article-receiving area extending to the opposite ends of top portion 12. FIGURE 1 shows in exploded form the mounting of pipe 18 in groove 17 and the connection of pipe 18 to the bracket frame 10 by means of U-bolt 19 which fits into a spaced-apart pair of apertures 20 in top portion 12, said apertures 20 being positioned on opposite sides of recessed groove 17. The tightening of U-bolt 19 by means of nuts 21 secures pipe 18 to bracket frame 10 in snug-fitting relationship with recessed groove 17. Pipe 18 may be taken as representative of a section of a gas meter inlet or outlet pipe.

For maximum rigidity the cross-sectional arc of recessed groove 17 should preferably be contoured to the outside diameter of pipe 18; i.e. the diameter of said arc should be about equal to the outside diameter of the pipe. Similarly, U-bolt 19 should preferably be dimensioned to fit fairly snugly around pipe 18.

Apertures 20, grooves 17 and U-bolt 19 will usually be dimensioned to accommodate a standard diameter pipe. Use of the bracket of the invention with varying diameter pipes is contemplated, however, with varying degrees of rigidity resulting. To provide for the attachment of two or more diameter pipes, the optional U-bolt 19a (FIGURE 2) can be used. The sweep of the U in U-bolt 19a curves outwardly to form a rounded section 19b about its central axis which is a generally circular extension thereof. As shown by the dotted circles in FIGURE 2, U-bolt 19a can be thus used to secure at least two substantially different diameter pipes to bracket frame 10. In order for U-bolt 19a to extend through apertures 20 sufficiently to engage a smaller diameter pipe 18a with circular extension 19b, the shape of its U is squared slightly. As shown in FIGURE 2, engagement of pipe 18 by U-bolt 19a is accomplished at the points of contact between the two rather than the flush contact brought about between U-bolt 19 and pipe 18. Nevertheless, tightening of U-bolt 19a to bring pipe 18 into snug-fitting relationship with groove 17 ensures the desired rigidity. Flush contact with smaller diameter pipe 18a is provided by circular extension 19b of U-bolt 19a (see FIGURE 2).

Returning to FIGURE 1, feet 15 and 16 are provided with apertures 22a and 22b, respectively, which provide means for attaching bracket frame 10 to a fixed surface such as a wall or building foundation. The aperture 22a in foot 15 is preferably circular in shape, whereas the aperture 22b in foot 16 is preferably elongated to thereby allow for slight pivoting and displacement of the bracket frame 10 when it is being adjusted in place on the fixed surface.

The external side edges of the bracket frame 10 are folded outwardly of the frame in a direction away from the imaginary base 11. The outwardly folded external side edges 23 provide increased rigidity to the bracket frame 10 and further provide means for receiving the arms of a meter bar, as will now be described. As shown in FIGURES 1 and 3, the outwardly folded external side edges 23 of the top portion 12 of frame 10 are each provided with a pair of spaced notches. The individual notches 24, 25, 26 and 27 in each pair are in registry with the corresponding notches in the other pair, i.e., notch 24 with notch 26, and notch 25 with notch 27. The distance between the notches in each pair (e.g., notches 26 and 27) is equal to the distance between the notches in the other pair (e.g., notches 24 and 25). There is thus provided receiving means for the arms of a channel bar, I-bar and the like. FIGURE 3 shows in exploded form the mounting of a conventional meter bar 28 having an I-shape cross-section as shown in FIGURE 4. Pipe elbows 29 and 30 for connection to gas meter inlet and outlet pipes are shown at opposite ends of meter bar 28.

The meter bar 28, after it is mounted in the notches 24, 25, 26 and 27, is fastened to bracket frame 10 by means of a bolt 32 which passes through aperture 33 in the web portion 31 of meter bar 28, and through an aperture 34 located within recessed groove 17 in top portion 12. Rigid mounting of meter bar 28 is ensured by tightening of nut 36 on bolt 32 against washer 35.

In the above manner, bracket frame 10 is adapted for the longitudinal mounting of pipe 18 in recessed groove 17 or the transverse mounting of meter bar 28 in notches 24, 25, 26 and 27. In order to provide for further adjustability and variability in the positioning of the bracket to a building foundation and the like, legs 13 and 14 depend from top portion 12 at different obtuse angles. Thus, in FIGURE 1, the obtuse angle between leg 13 and top portion 12 is substantially greater than the obtuse angle between leg 14 and top portion 12. This provision enables the bracket to be affixed to the building foundation in either of two positions by simply rotating it 180°. Rotation of the bracket shown in FIGURE 1 will thus move top portion 12 upwards of its original position on the building, although the location of apertures 22a and 22b will not be displaced. This feature is of considerable value at the installation site where obstructions are often presented or where the installation space is limited. For example, after connection of the bracket to a building foundation, the distance to the ground may be too small to allow for the attachment of the gas meter and its connections. The meter can thus be raised by simply reversing feet 15 and 16 without the necessity for tapping new holes in the building foundation for reattaching the bracket at a new position.

In a further embodiment, notches 24 and 25, and 26 and 27 are spaced apart at a predetermined distance and are of a predetermined width or diameter, which are sufficient to receive the arms 31a and 31b of meter bar 28 in snug-fitting relationship. To provide for the reception of varying diameter meter bars in common use, the width of notches 24, 25, 26 and 27 is preferably greater than the thickness of meter bar arms 31a and 31b. The notches are spaced apart and dimensioned either to cause the outer surfaces of arms 31a and 31b to bear against the outer walls (or corners) of the notches (as shown in FIGURE 4) or to cause the inner surfaces of arms 31a and 31b to bear against the inner walls (or corners) of the notches (as shown in FIGURE 5). Thus, by dimensioning the width of the notches to be greater than the thickness of meter bar arms, a plurality of varying diameter meter bars can be accommodated in relatively snug-fitting relationship by means of the bearing of the meter bar arms against either the inside or outside walls or corners of the notches 24, 25, 26 and 27 provided in the outwardly turned edges 23 of the top portion 12 of the bracket frame 10.

It will be seen from the foregoing that the bracket of the invention provides a unique combination of desirable attributes including economy, appearance, versatility, rigidity, and mass producibility.

What is claimed is:

1. A bracket for mounting a pipe, tube, channel bar, I-bar and the like, comprising a one-piece metal frame bent into the general shape of a truncated triangle with an imaginary base, said bracket having a top portion spaced apart from and generally parallel to said imaginary base, a pair of legs corresponding to the sides of the triangle and extending at obtuse angles from opposite ends of the top portion, and a pair of feet extending outwardly at obtuse angles from the legs as extensions of said imaginary base, the external side edges of said frame being folded outwardly of the frame in a direction away from the imaginary base, said top portion having a relatively flat planar surface provided with a recessed, longitudinal groove defining an elongated cylindrical article-receiving area thereon extending to the opposite ends of said top portion, the outwardly folded external side edges of said top portion each having a pair of spaced notches with each notch of each pair being in registry with the corresponding notch of the other pair to thereby provide receiving means for the arms of a channel bar, I-bar and the like, said top portion also having both fastener-receiving means for the longitudinal mounting of said cylindrical article in said recessed grove and fastener-receiving means for the transverse mounting of said channel bar, I-bar and the like in said notches, and aperture means in said feet providing for attachment of said bracket to a fixed surface.

2. The bracket of claim 1, wherein the notches in each pair are of a predetermined width and are spaced apart at a predetermined distance sufficient to receive the arms of said channel bar, I-bar and the like in snug-fitting relationship by means of the bearing of the outer surfaces of said arms against the outer walls of said notches.

3. The bracket of claim 1, wherein the notches in each pair are of a predetermined width and are spaced apart at a predetermined distance sufficient to receive the arms of said channel bar, I-bar and the like in snug-fitting relationship by means of the bearing of the inner surfaces of said arms against the inner walls of said notches.

4. The bracket of claim 1, wherein said fastener-receiving means for the longitudinal mounting of said cylindrical article in said recessed groove comprises a spaced-apart pair of apertures in said top portion on opposite sides of said recessed groove adapted to receive a U-bolt across said recessed groove to thereby affix said cylindrical article to said bracket in snug-fitting relationship.

5. The bracket of claim 1, wherein said fastener-receiving means for the transverse mounting of said channel bar, I-bar and the like comprises aperture means within said recessed groove in said top portion and adapted to receive a bolt therein to thereby affix the web of said bar to said bracket.

6. The bracket of claim 1, wherein the obtuse angle between one of said legs and said top portion is greater than the obtuse angle between the other of said legs and said top portion.

7. The bracket of claim 1, wherein the aperture means in said feet comprises a circular aperture opening in one foot and an elongated aperature opening in the other foot to thereby allow for slight pivoting and displacement of said bracket when it is attached to said fixed surface.

8. Gas meter mounting means comprising the bracket of claim 4, a gas meter inlet pipe and a gas meter outlet pipe, one of said pipes being longitudinally mounted in said recessed groove in the top portion of said bracket, said mounted pipe being firmly secured to said bracket by U-bolt means passing through said spaced-apart pair of apertures.

9. The gas meter mounting means of claim 8, wherein the bottom sweep of the U in said U-bolt curves downwardly to form a rounded section about its central axis which is a generally circular extension thereof, whereby said U-bolt can secure at least two substantially different diameter pipes.

10. Gas meter mounting means comprising the bracket of claim 5, a gas meter bar having a channel shape or I-shape cross section and a web portion provided with an aperture, said meter bar being transversely mounted on said bracket with the arms of the channel or I fitting into said spaced notches in the outwardly folded external side edges of the top portion of the bracket, and the mounted meter bar being firmly secured to said bracket by bolt means passing through the aperture in said web portion and the aperture means within said recessed groove in said top portion.

References Cited

UNITED STATES PATENTS

| | | | |
|---|---|---|---|
| 2,620,152 | 12/1952 | Niles. | |
| 2,698,151 | 12/1954 | Jenne | 248—67.5 |
| 3,309,047 | 3/1967 | Kane | 248—65 |

ROY D. FRAZIER, *Primary Examiner.*

ROBERT P. SEITTER, *Assistant Examiner.*